(12) United States Patent
Leiber et al.

(10) Patent No.: US 8,371,661 B2
(45) Date of Patent: Feb. 12, 2013

(54) BRAKE SYSTEM WITH ELECTROMOTIVELY DRIVEN PISTON/CYLINDER SYSTEM

(75) Inventors: Heinz Leiber, Oberriexingen (DE); Thomas Leiber, München (DE)

(73) Assignee: Ipgate AG, Pfäffikon Sz (CH)

( * ) Notice: Subject to any disclaimer, the term of this patent is extended or adjusted under 35 U.S.C. 154(b) by 881 days.

(21) Appl. No.: 11/912,291

(22) PCT Filed: Apr. 20, 2006

(86) PCT No.: PCT/EP2006/003647
§ 371 (c)(1),
(2), (4) Date: Oct. 22, 2007

(87) PCT Pub. No.: WO2006/111392
PCT Pub. Date: Oct. 26, 2006

(65) Prior Publication Data
US 2010/0026083 A1    Feb. 4, 2010

(30) Foreign Application Priority Data
Apr. 21, 2005 (DE) .................. 10 2005 018 649

(51) Int. Cl.
*B60T 8/34* (2006.01)

(52) U.S. Cl. .................. 303/113.4; 60/545; 303/3

(58) Field of Classification Search .......... 303/3, 15, 303/113.4, 115.2, 155; 60/538, 545
See application file for complete search history.

(56) References Cited

U.S. PATENT DOCUMENTS

| | | | | |
|---|---|---|---|---|
| 3,893,698 A | * | 7/1975 | Fontaine | 303/89 |
| 4,057,301 A | | 11/1977 | Foster | |
| 4,327,414 A | * | 4/1982 | Klein | 701/79 |
| 4,655,512 A | | 4/1987 | Leiber | |
| 4,824,186 A | | 4/1989 | Leiber et al. | |
| 4,950,028 A | * | 8/1990 | Harrison | 303/113.2 |
| 5,433,514 A | * | 7/1995 | Tsukamoto et al. | 303/113.2 |

(Continued)

FOREIGN PATENT DOCUMENTS

| | | |
|---|---|---|
| DE | 3241662 | 5/1984 |
| DE | 3914401 A1 | 10/1990 |

(Continued)

OTHER PUBLICATIONS

International Search. Report issued in corresponding International Application No. PCT/EP2006/003647 on Aug. 9, 2006.

*Primary Examiner* — Robert A Siconolfi
*Assistant Examiner* — Stephen Bowes
(74) *Attorney, Agent, or Firm* — Connolly Bove Lodge & Hutz LLP

(57) ABSTRACT

The invention relates to a brake system which comprises an actuating device (26), especially a brake pedal (30), and a control/regulation device (22). Said control/regulation device (22) controls an electromotive drive device (8) in response to the movement and/or position (38) of the actuating device (30). The drive device (8) adjusts a piston (1) of a piston/cylinder system via a non-hydraulic transmission device (6), thereby adjusting a pressure in the working compartment (4') of the cylinder (4). Said working compartment (4') is connected to a wheel brake (15, 17) via a pressure conduit (13). In case of drive device (8) failure, the actuating device (26) adjusts the piston (1) or the drive device (8).

26 Claims, 11 Drawing Sheets

U.S. PATENT DOCUMENTS

| | | | |
|---|---|---|---|
| 5,678,671 A | 10/1997 | Leimbach et al. | |
| 5,887,954 A | 3/1999 | Steiner et al. | |
| 6,079,792 A | 6/2000 | Kessler | |
| 6,315,371 B1 | 11/2001 | Wachi et al. | |
| 6,634,724 B2 * | 10/2003 | Kobayashi et al. | 303/155 |
| 2003/0160503 A1 | 8/2003 | Riddiford et al. | |
| 2003/0201669 A1 | 10/2003 | Yokoyama et al. | |

FOREIGN PATENT DOCUMENTS

| | | |
|---|---|---|
| DE | 4239386 | 5/1994 |
| DE | 4445975 | 6/1996 |
| DE | 19750977 | 6/1999 |
| DE | 10057557 A1 | 12/2001 |
| WO | WO-2004/005095 | 1/2004 |

\* cited by examiner

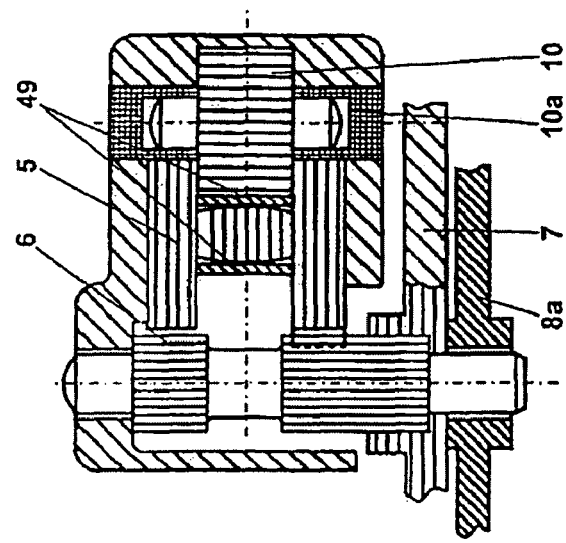
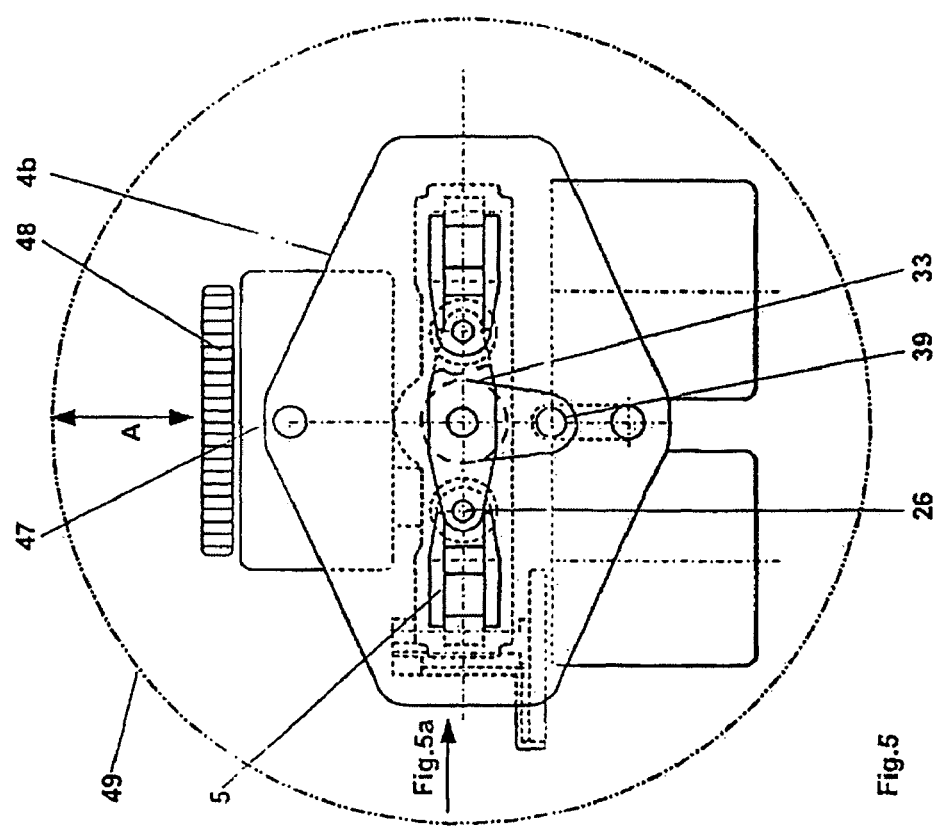

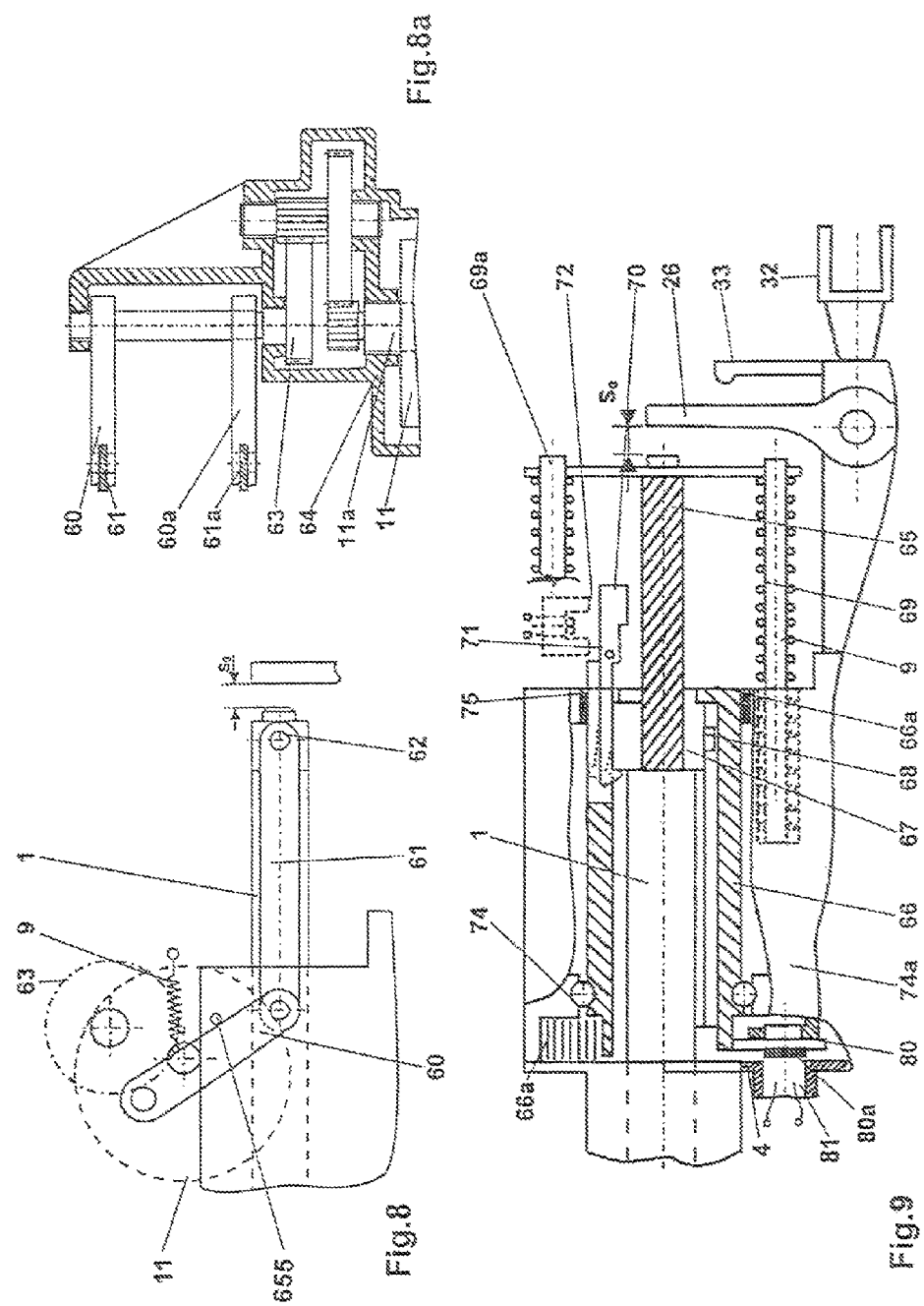

BRAKE SYSTEM WITH ELECTROMOTIVELY DRIVEN PISTON/CYLINDER SYSTEM

The present invention relates to a brake system, comprising an actuating device, in particular a brake pedal, and a control and regulating device, the control and regulating device controlling an electromotive drive device using the movement and/or position of the actuating device, the drive device adjusting a piston of a piston-cylinder system via a non-hydraulic gearing device, so a pressure is adjusted in the working chamber of the cylinder, the working chamber being connected to a wheel brake by a pressure line.

PRIOR ART

Modern brake systems comprise power-assisted braking, i.e. conversion of the pedal force into a correspondingly boosted braking torque at the wheel brakes and braking force regulation by way of open or closed regulating and control circuits. Except for in a few cases in the automobile sector the hydraulic line is used as the transmitting means to generate the braking pressure from the pedal force.

A division into modular units between power-assisted braking (PAB) or braking force control and braking force regulation in a hydraulic unit (HU) is widely used. This configuration is predominantly used in systems such as antilock braking systems (ABS), antislip regulation (ASR), electronic stability programs (ESP) or electrohydraulic brakes (EHB).

The hydraulic unit (HU) comprises solenoid valves, multipiston pumps for 2-circuit brake systems, electric motor for pump drive, hydraulic reservoir and a plurality of pressure transducers. The pressure is regulated such that to reduce the braking torque pressurising medium is released via solenoid valves from the wheel brakes into a reservoir and is pumped back into the master cylinder by the pump, and this causes a pedal movement. Both the pressure increase and pressure drop are controlled by solenoid valves in which pressure transducers are partially used for controlling the solenoid valves. Apart from in the case of EHB, power-assisted braking takes place using vacuum PAB which partially includes switching means and sensors for what is referred to as the brake assist function and also for recognising what is known as the control point. In the case of spark ignition engines the internal-combustion engine is used as the energy source but as a direct injection engine still only supplies a weak vacuum, in particular at the higher level. A mechanical or electrically driven vacuum pump is used in the case of diesel engines. The latest ESP systems are capable of achieving additional power-assisted braking or, in the case of failure of the PAB, power-assisted braking with a higher time constant by switching of the solenoid valves and pumps. The description of these systems and functions is given in detail in the Bremshandbuch (Braking Manual), Vieweg Verlag, 2003 edition.

In the middle of the 1980s Teves used what is known as the Mark II and Bosch the ABS3 which included all components for power-assisted braking and regulation as integrated units with hydraulic PAB, see Kraftfahrtechnisches Handbuch (Automotive Manual) Bosch 1986, 20$^{th}$ edition. Except for use in armoured vehicles, these systems did not establish themselves for cost reasons. The same applies to completely electromechanical braking systems, known as EMB, with electric motors at the wheel brakes, which were intensively developed in conjunction with the 42 volt on-board electrical system. Apart from the additional costs a new, redundant on-board electrical system is required in this case for the energy supply in order to ensure the braking capacity of a brake circuit in the event of a fault.

Wedge brakes with electromotive drive also belong to this type of EMB system. A redundant on-board electrical system is still required in this case despite the lower energy requirement. The constructional implementation of the wedge brake, which requires additional rollers for hysteresis reasons, which in turn require integration in the calliper, has not yet been achieved. The wedge brake with its electromotive drives with sensors has to be able to withstand the harsh ambient conditions (dust, water, high temperatures).

The systems for PAB and HU have been very widely developed, in particular the control and regulating functions for ABS to ESP. For example, by way of pressure-guided control of the solenoid valves very fine regulation of the brake pressure is possible with which a variable brake force adjustment—electronic brake force distribution—is possible. The pressure reduction speed is still not optimal since it is highly non-linear. The pressure reduction speed is also determined by the relatively low pumping level in the case of a $\mu$-jump or with a low coefficient of friction, and this leads to large deviations and results therewith in a braking distance loss.

A generic brake system is known from DE 3342552. In this brake system the master cylinder is used to generate a pedal-dependant pressure that is used as a reference variable for an electronic control and regulating device which regulates the initial pressure of an electrohydraulic servo device directly connected to the brake circuit to a value determined by the reference variable. In the case of failure of the regulating device or the servo device itself the pressure in the brake circuit is generated by the master cylinder. Instead of the reference variable generated by means of the master cylinder during normal operation, it is possible to allow a reference variable generated within the framework of an antilock braking system or within the framework of a slip regulation of the drive regulation of the motor vehicle to act on the electronic control and regulating device and therewith on the electrohydraulic servo device. The servo device comprises an electrically actuated hydraulic piston-cylinder unit, of which the working chamber is connected to the brake circuit and of which the piston can be axially adjusted by means of an electric motor. The rotary movement of the electric motor is converted into a longitudinal movement of the piston via a spindle connected to the piston.

OBJECT OF THE INVENTION

The present invention has the object of providing a novel brake system which is small and compact in its dimensions.

This object is advantageously achieved by a brake system with the features of claim 1. Further advantageous embodiments of the brake system according to claim 1 emerge by way of the features of the subclaims.

The brake system according to the invention is advantageously characterised in that it implements power-assisted braking and the servo device in the smallest space per brake circuit by means of just one piston-cylinder unit. The piston-cylinder unit is also used for building up and reducing the brake pressure, to implement the ABS and antislip regulation and in the case of failure of the energy supply or malfunctioning of the drive device. A small, integrated and inexpensive modular unit is thus advantageously produced for power-assisted braking (PAB) and regulation, whereby this is accompanied by a reduction in installation space, assembly costs and additional hydraulic and vacuum connecting lines. Moreover, owing to the short overall length, the spring dome for example advantageously does not act on the master cylinder and the crank gear in the event of a front impact.

The advantageous provision of sensor system and a travel simulator means that a variable pedal characteristic, such as a brake-by-wire function, i.e. increase in brake pressure, can be freely variably adjusted independently of pedal actuation, even when the braking effect of the generator is taken into account in the case of recuperable brakes.

Furthermore with an appropriate configuration there is no disadvantageous failure of the brake pedal if the drive fails since the pedal acts directly on the piston of the system. Lower pedal forces also advantageously result hereby in the case of failure of the energy supply since the pistons have a smaller effective area than conventional master cylinders. This is possible by separating the piston travel in the case of faultless and failed boosting. This is called a gear jump which reduces the pedal force for the same braking effect by up to 40%. Reducing the overall complexity, including that of the electrical connections, advantageously results in a reduction in the failure rate moreover.

An improvement in the ABS/ESP regulation by finely regulated pressure control with variable pressure increase and, in particular pressure reduction, speeds can also be achieved by the electromotive drive. A pressure reduction to below 1 bar in the region of a vacuum is also possible for operation with the smallest coefficients of friction, for example wet ice. A rapid increase in pressure at the start of braking, for example 0 to 100 bar, can also be achieved in less than 50 ms, and this results in a considerable reduction in braking distance.

The brake system according to the invention requires much less energy owing to the advantageous provision of a 2/2-way valve for power-assisted braking and the regulating function.

It is also possible to provide a separate piston-cylinder system with associated drive respectively for each brake circuit or each wheel brake. It is also possible to use a piston-cylinder system in which two pistons are axially displaceably arranged in one cylinder, the cylinders being hydraulically coupled and only one piston being electromotively driven mechanically by the drive device.

BRIEF DESCRIPTIONS OF THE DRAWINGS

Various embodiments of the brake system according to the invention will be described in more detail hereinafter with reference to drawings, in which.

Figure 4:
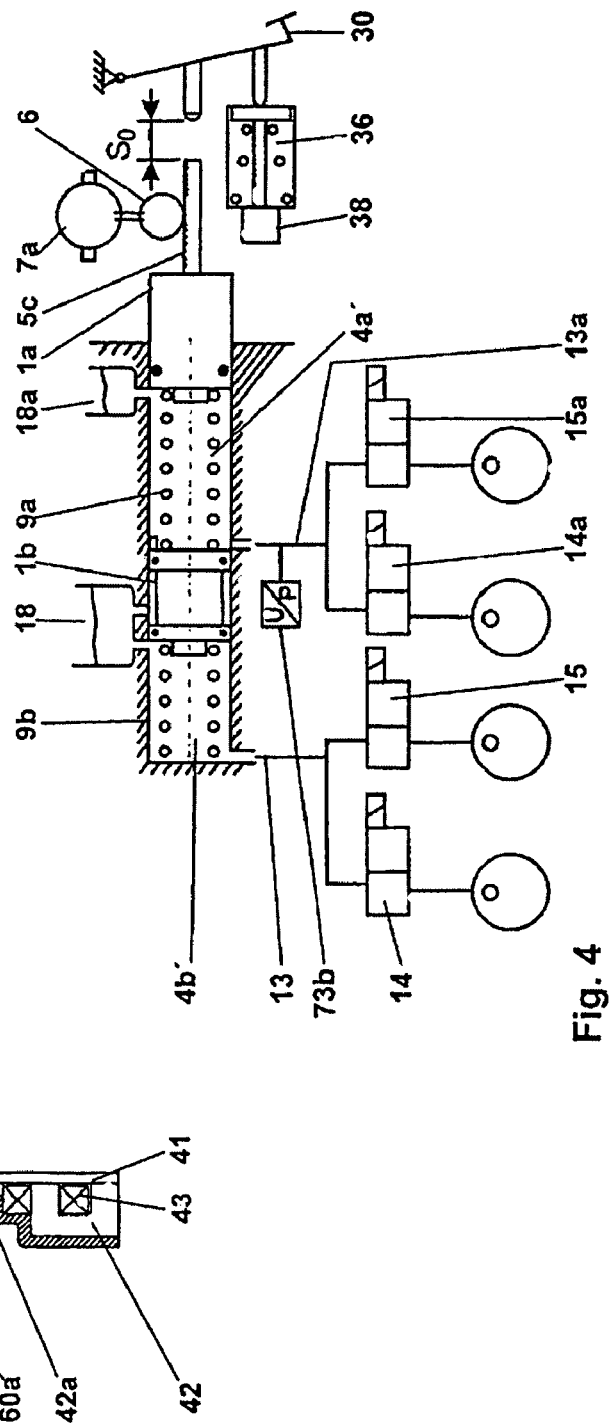
Figure 4A:
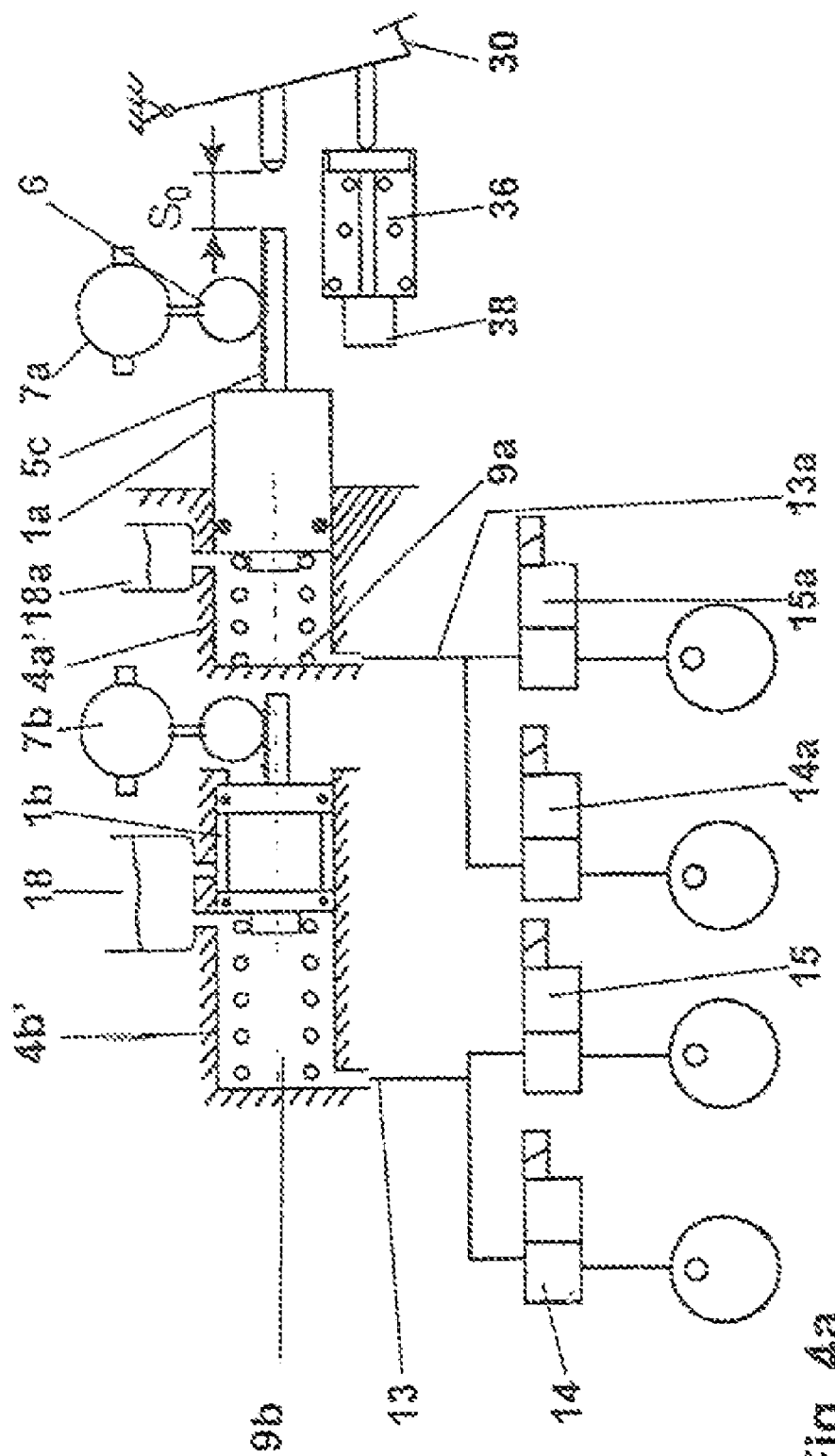
Figure 4B:
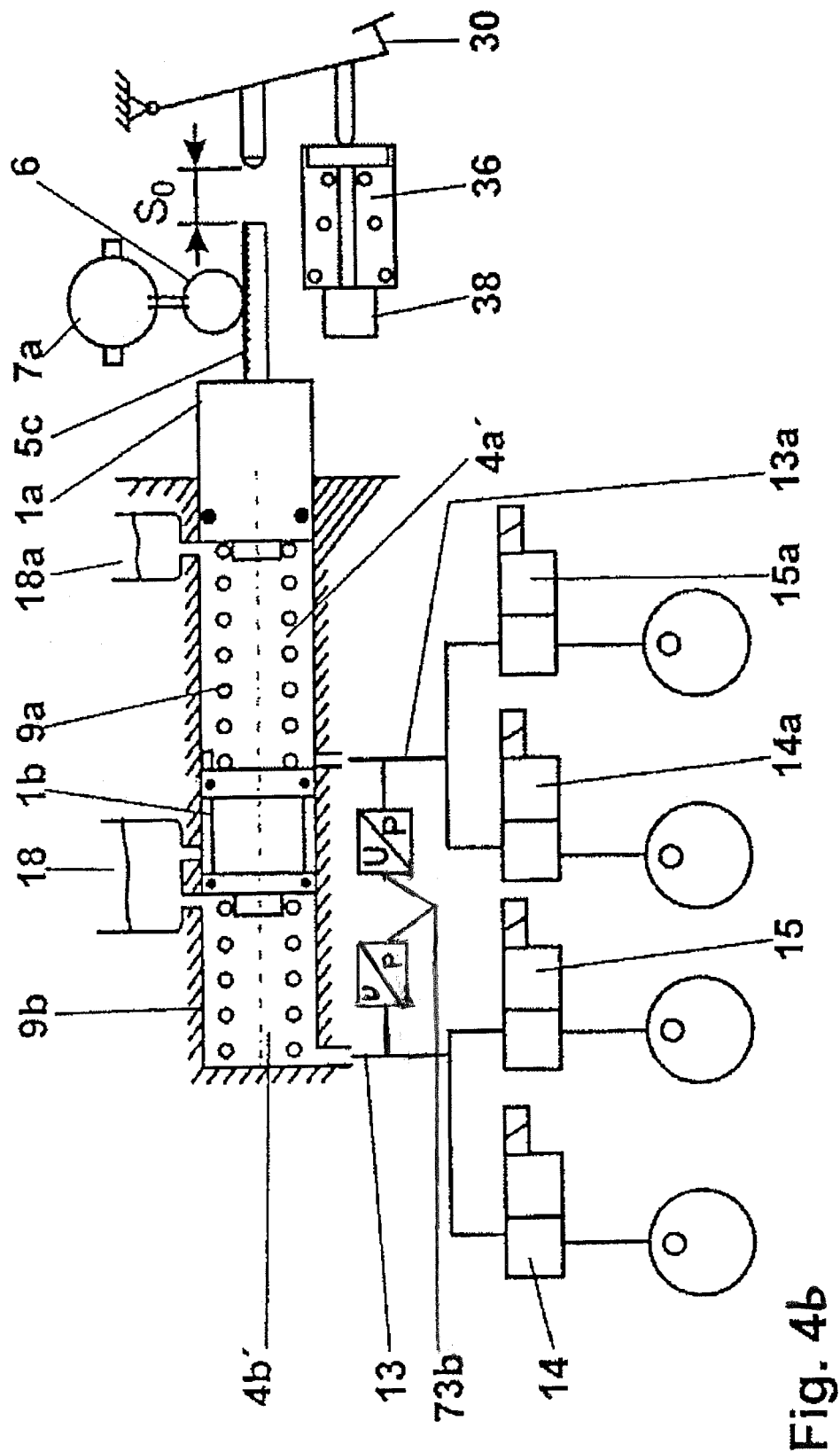
Figure 6:
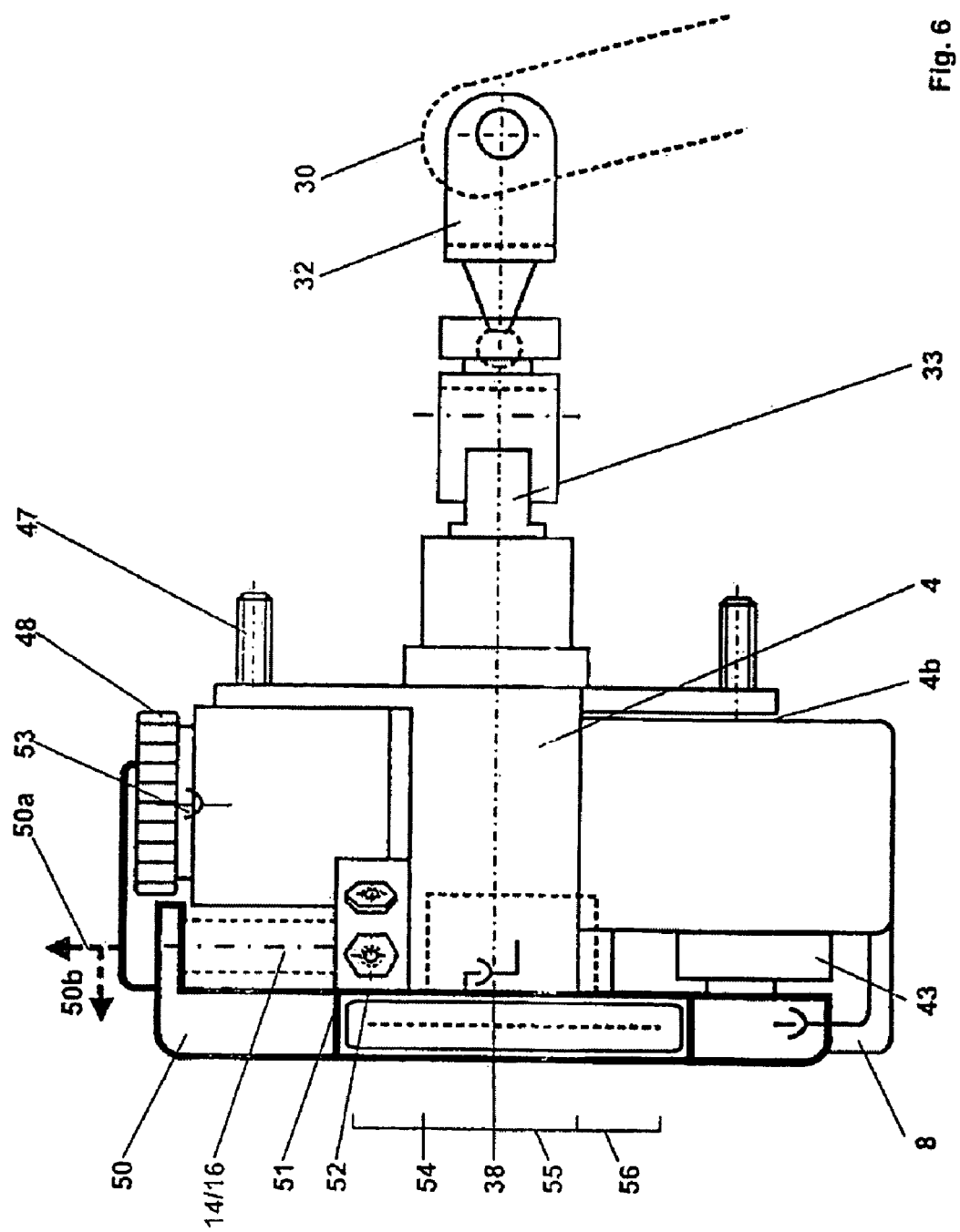
Figure 7:
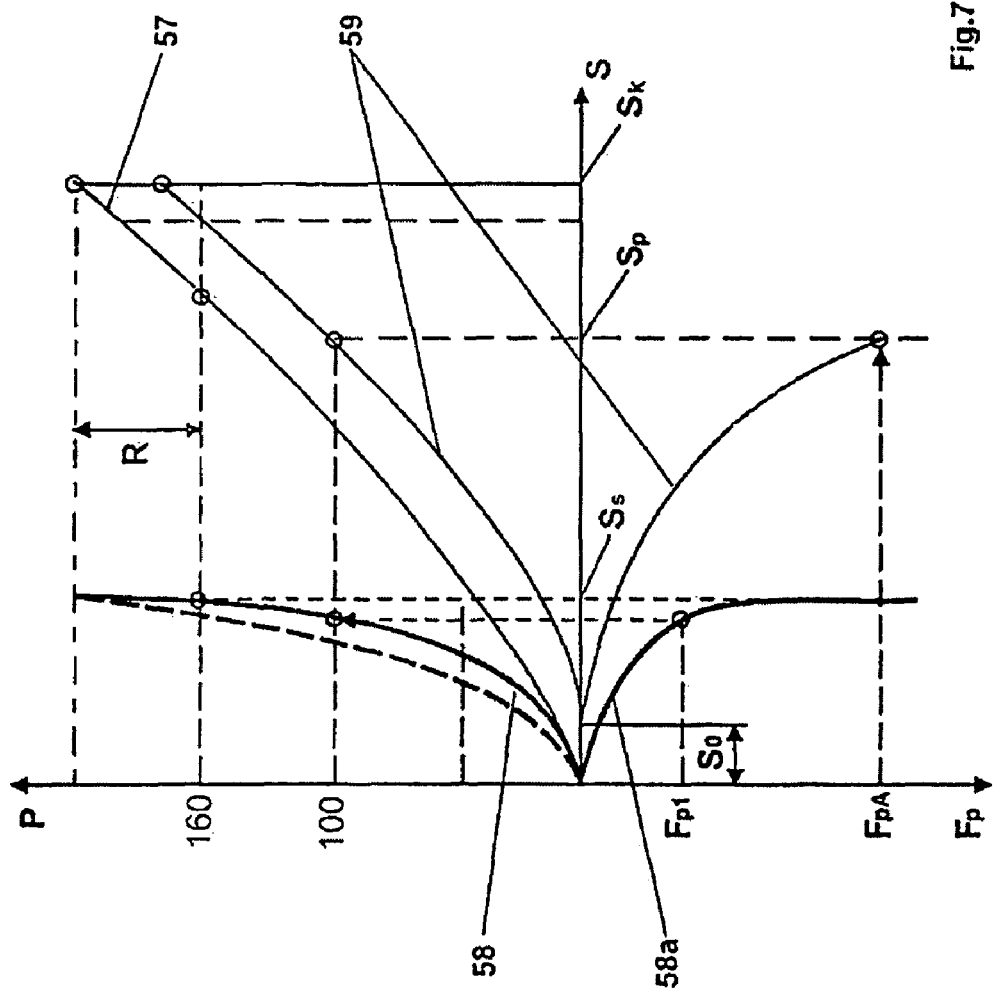
Figure 10:
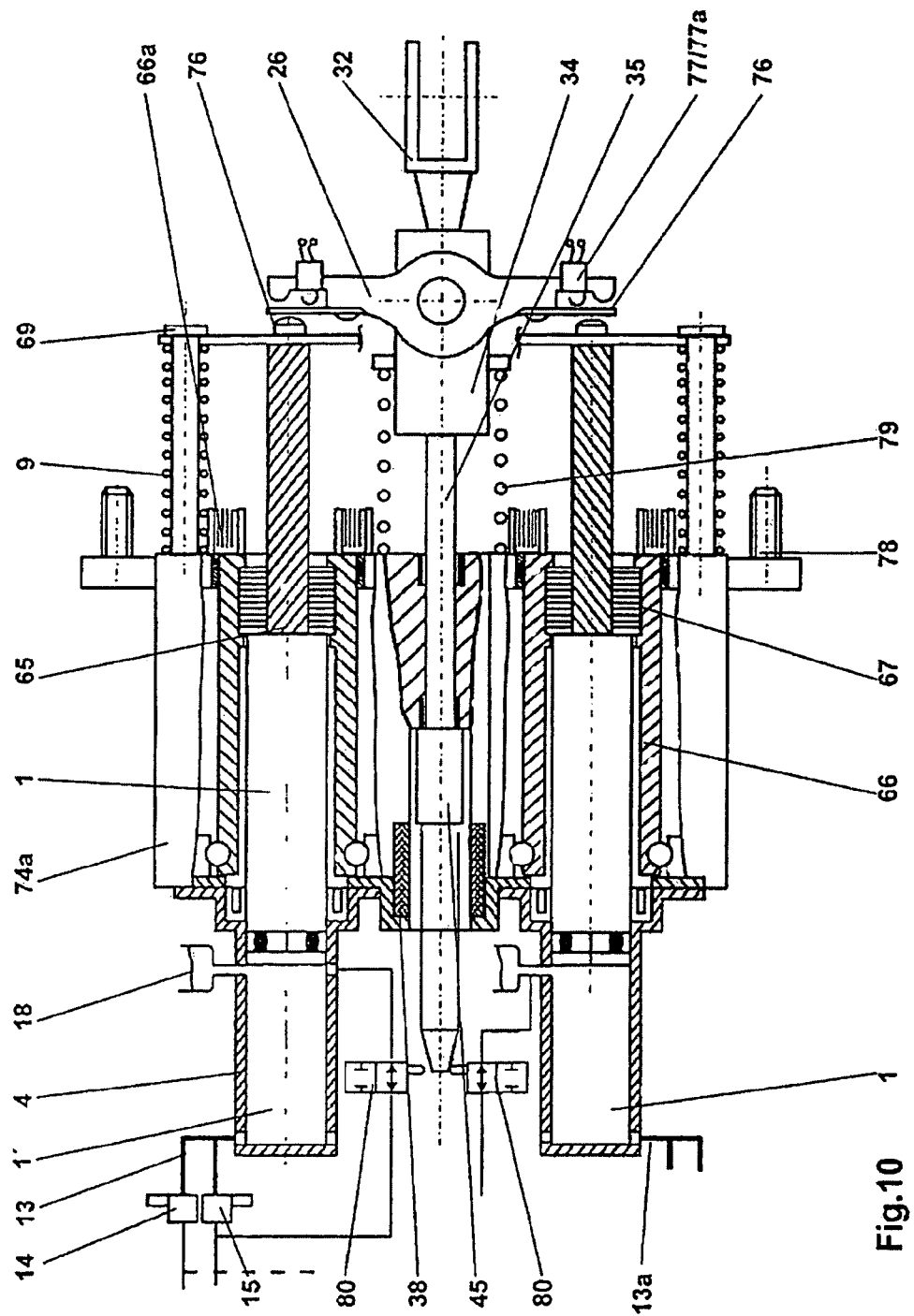

FIGS. 4, 4a, and 4b show various piston-cylinder systems having two pistons;

FIGS. 5 and 5a show a connection between actuating device and piston-cylinder systems;

FIG. 6 shows a side view of the integrated modular unit with housing;

FIG. 7 shows characteristic curves of the brake system;

FIGS. 8 and 8a show a piston drive via a rocker arm;

FIG. 9 shows a piston drive via a spindle;

FIG. 10 shows piston actuation with superposed pedal force; and

Figure 11A:
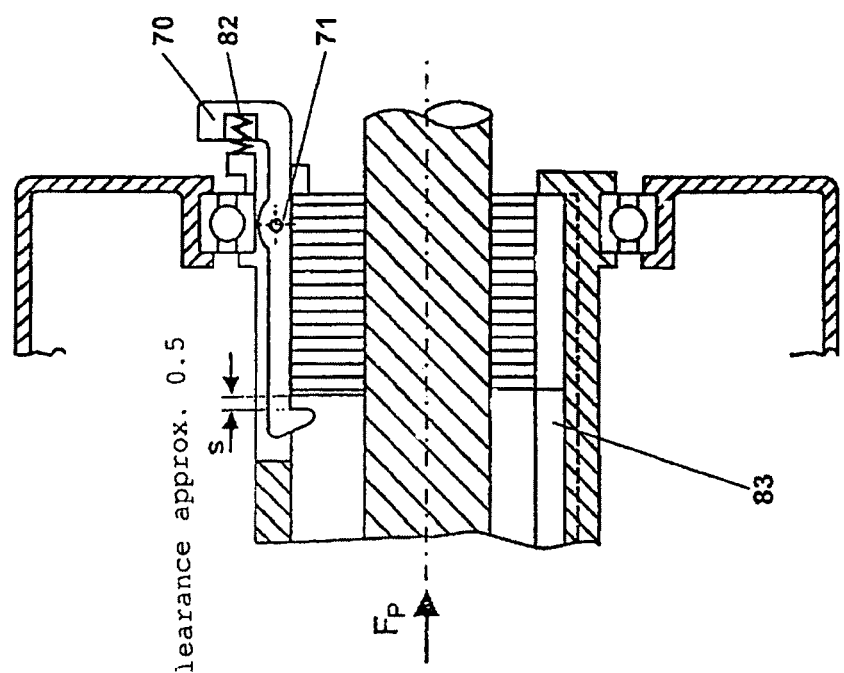
Figure 11:
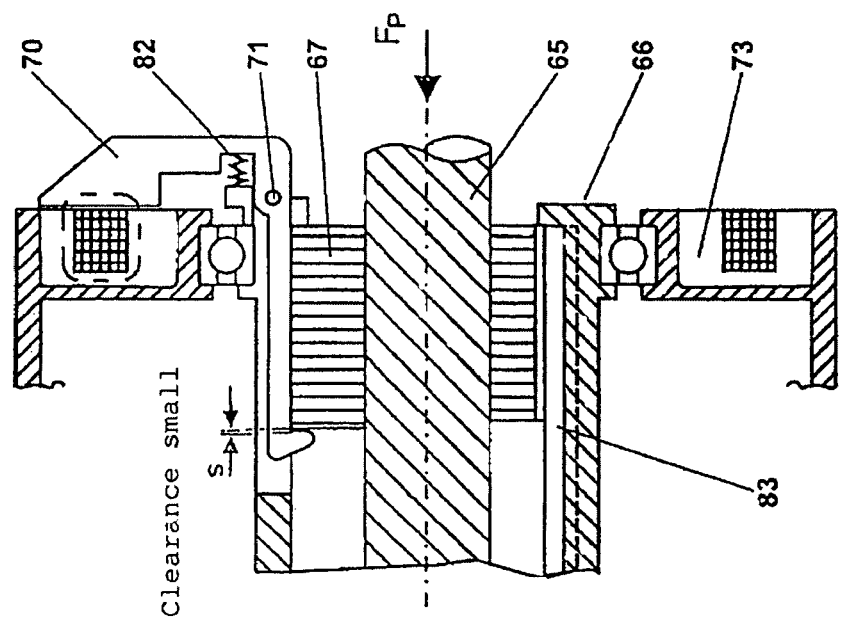

FIGS. 11 and 11a show exemplary arrangements for fixing of a spindle nut.

DETAILED DESCRIPTION OF VARIOUS EMBODIMENTS

Figure 1:
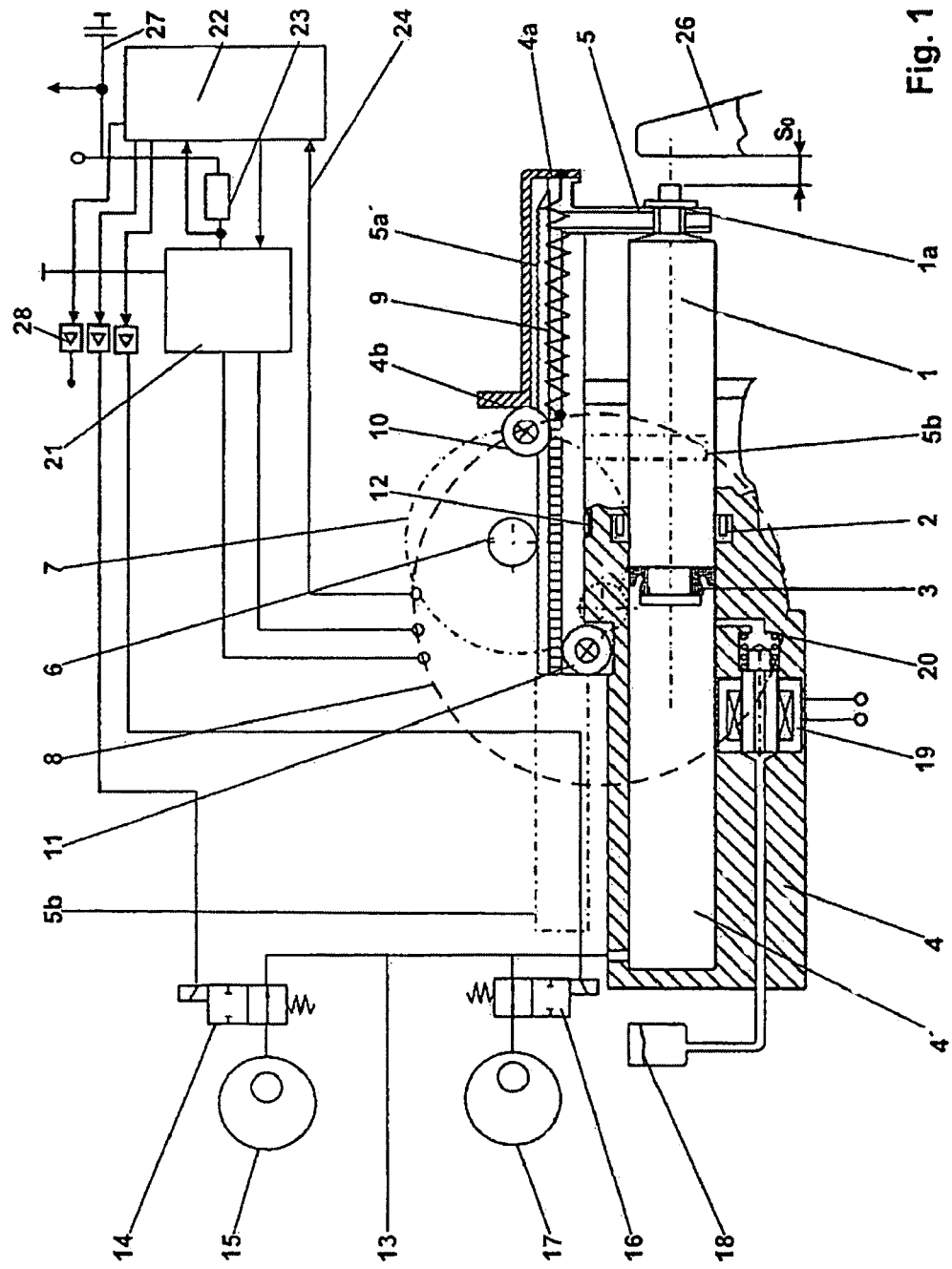
FIG. 1 shows a first embodiment of a brake system with one brake circuit for two wheel brakes.

FIG. 1 shows a detail of the integrated unit which is responsible for generating pressure or power-assisted braking. In this connection the piston 1 with the conventional seals 2 and 3 is moved in the cylinder housing 4 parallel to the piston via a specially designed toothed rack 5a. The seal 2 is designed in such a way that it also provides a seal in the case of a vacuum in the piston chamber 4'. This toothed rack 5a transmits the force to the leading, crowned end of the piston 1. At this location it has a collar stud 1a via which the toothed rack 5a, with restoring spring 9, brings the piston into the starting position. In this case the toothed rack adjoins the cylinder housing 4a. This external spring has the advantage that the cylinder has a short design and little clearance volume, and this is advantageous for ventilation. Owing to the lateral forces the toothed rack is mounted in the rollers 10 and 11 with a slider 12. FIG. 1 clearly shows that the parallel arrangement of the toothed rack with respect to the piston results in a short overall length. The modular unit must be very short in order to be outside of the crash zone. The toothed rack is highly deflection resistant owing to an H-profile shown in FIG. 5a. The arrangement of the rollers is selected such that in the end position 5b (shown in broken lines) with the greatest bending force, the toothed rack has a relatively small bending length owing to the compressive force that acts in an offset manner. The toothed rack is driven by toothed profile 5a' and toothed wheel 6 via the gearwheel 7 by the pinion of the motor 8. This motor with a small time constant is preferably a brushless motor as a drag-cup with air-core wiring, or preferably a motor corresponding to PCT patent applications PCT/EP2005/002440 and PCT/EP2005/002441. It is controlled by the output stages 21, preferably by three branches of a microcontroller (MC) 22, which may have associated data storage. A shunt 23 measures the current for this purpose and a sensor signal 24 indicates the position of the rotor and, by way of appropriate counters, the position of the piston. The current and position measurement is used, in addition to motor control, for indirect pressure measurement since the motor torque is proportional to the compressive force. For this performance data have to be applied in the vehicle on start-up and during operation, in which data the position of the piston is associated with the various current strengths. During operation a position of the piston is approached in accordance with the booster characteristic curve, described later, which position, according to the performance data, corresponds to a specific pressure. If position and motor torque do not completely match, for example owing to the effect of temperature, the performance data are adapted during operation. The performance data are continuously adapted thereby. The initial performance data are preferably formed from pressure-volume characteristic curves of the wheel brake, motor parameter, gear efficiency and vehicle deceleration. A pedal force-proportional vehicle deceleration can be achieved with the latter, so the driver does not have to adjust to different braking effects.

The piston 1 generates a corresponding pressure in the line 13 which passes via the 2/2-solenoid valve (SV) 14 to the wheel brake 15 or via solenoid valve SV 16 to the wheel brake 17. The described arrangement has several advantages. Instead of the two inexpensive small solenoid valves a further piston-motor unit could be used, as is illustrated in FIG. 4. However this means additional costs, weight and installation space.

It is sufficient to use one piston-motor unit for each brake circuit.

The second advantage is the very small energy requirement and also the configuration of the motor for pulsed operation only. This is achieved by closing the solenoid valves when the desired pressure value or motor torque is attained and the motor is subsequently only operated with low amperage until a new desired value is stipulated by the brake pedal. For this reason the energy requirement or the mean output is extremely low. For example in a conventional configuration the motor 3 would take up a high current in the case of full brake application from 100 km/h. According to the invention the motor requires only about 0.05 s of current for the piston travel, and this accounts for 1.7%. If the values are based on the output, the on-board electrical system would conventionally be loaded with greater than 1,000 watts for a minimum of 3 s and in the case of the proposed pulsed operation only approx. 50 watts mean output. An even greater energy reduction results in the case of full brake application from 250 km/h with braking times of up to 10 s on dry roads. To relieve the impulse loading of the on-board electrical system, a storage capacitor 27 can be used in the current supply in this case and can also be used according to the line with the arrow for the additional electric motors.

Pressure transducers (not shown as they correspond to the prior art) can be used in the pressure line 13 upstream or downstream of the solenoid valve.

The piston 1 is supplied with liquid from the reservoir 18 via the pressure-relief valve. A solenoid valve 19 is inserted in this line. If there is a quick piston movement to reduce the pressure, the seal 3, in particular in the case of low pressures, could release fluid from the reservoir, and, as is known, this is disadvantageous. For this purpose the low-pressure solenoid valve 19 is closed and the connection to the reservoir broken. This switching can also achieve a vacuum in the wheel circuits 15/17, and this is to the benefit of wheel control in the case of very low coefficients of friction, for example on wet ice, since no braking torque is generated in the wheel brake. On the other hand pressure relief can be consciously used in the case of vapour bubble formation in which the piston is already at the stop without the corresponding pressure having been attained. In this connection the pistons are appropriately controlled by the solenoid valves, so the oscillating piston builds up pressure. If this function is omitted, a pressure-resistant seal 3 can be used in place of the solenoid valve 19.

The solenoid valves 14, 16, 19 are controlled via output stages 28 by the microcontroller 22.

In the case of failure of the energy supply or the electric motor, the piston is moved by a lever 26 of the actuating device. A clearance is incorporated between the actuating device and the piston and in the event of fast pedal actuation prevents the lever from striking the piston before the motor moves the piston.

The regulating function with respect to the wheel speed and pressure in the case of ABS/ASR, or yaw rate and wheel pressure in the case of ESP, has been illustrated in various publications, so it will not be described again here. The essential functions of the new system shall be shown in a table:

| Functions | Electric motor | Pressure in wheel brake 15 | Solenoid valve 14 0 = open 1 = closed | Pressure in wheel brake 17 | Solenoid valve; 15 0 = open 1 = closed |
|---|---|---|---|---|---|
| PAB | On | Build-up | 0 | Build-up | 0 |
|  | Partially supplied with current | P = constant | 1 | P = constant | 1 |
|  | Partially supplied with current | Reduction | 0 | Reduction | 0 |
| Brake regulation | On | Build-up | 0 | Build-up | 0 |
|  | Partially supplied with current | P = constant | 1 | P = constant | 0 |
|  | On | Build-up | 0 | P = constant | 1 |
|  | Partially supplied with current | Reduction | 0 | P = constant | 1 |
|  | Partially supplied with current | Reduction | 0 | Reduction | 0 |

The level of partial supply with current is guided by the pressure increase or reduction speed desired by the PAB or brake regulation. An extremely low time constant of the electric motor, i.e. a temporally quicker torque increase and torque reduction over small, movable masses of the overall drive, is critical for this since the piston speed determines the speed of the change in pressure. Fast and accurate position regulation of the piston is also required for brake regulation. The compressive force emanating from the callipers also assists in the case of fast torque reduction but is small in the case of low pressures. But it is precisely in this case that the speed of the drop in pressure should be high in order to avoid large deviations from the wheel speed, for example on ice.

This concept has a decisive advantage compared with conventional pressure control via solenoid valves since the piston speed determines the speed of the change in pressure. For example with a small differential pressure at the outlet valve that determines pressure reduction, the flow rate, and therewith the pressure reduction speed, is low. As already mentioned, the piston unit can be used separately for each wheel with and without solenoid valve. To utilise the advantages of the low energy consumption the electric motor would have to be expanded by a fast electromagnetic brake which is more complex, however. The illustrated design with one piston unit and two solenoid valves is preferable from installation space and cost perspectives. In terms of control engineering however the limitation that in the event of a pressure reduction at one wheel the other wheel cannot build up pressure applies. However since the pressure reduction time is approx. <10% of the pressure build-up time in the control cycle, this limitation does not have an appreciable drawback. The regulating algorithms have to be adjusted accordingly, for example after a phase of constant pressure of opening the solenoid valve the electric motor must be excited with a current with which the appropriate pressure in the wheel brake is associated according to the PAB characteristic curve, or, for example, is 20% greater than the preceding blocking pressure in the control cycle. Alternatively an adaptive pressure level may also be applied, for example even during regulation, which is 20% greater than the highest blocking pressure of the axle or vehicle. The blocking pressure is the pressure at which the wheel is unstable in the case of a relatively high slip.

In terms of control engineering the design also provides new possibilities of pressure reduction. In terms of control engineering the pressure reduction and braking torque reduction are substantially proportional to the rotational acceleration of the wheel, the hysteresis of the seal and inversely proportional to the moment of inertia of the wheel. The size of the required pressure reduction can be calculated respectively from these values and when the SV is closed the piston can already provide the corresponding volume by taking account of the described performance data. If the SV then opens there is a very rapid reduction in pressure almost to vacuum. Underlying this is the fact that owing to appropriate opening cross-sections, the SV, in contrast to current solutions, has a smaller throttling effect. In this connection the pressure can be reduced more quickly than in conventional solutions via a specially provided chamber volume corresponding to the pressure volume characteristic curve. Alternatively a pressure reduction, which is slightly greater than the required pressure reduction, is possible in one chamber volume, for example by way of an appropriate adjusting speed of the piston. For precise control of the pressure reduction a very short switching time is required to close the solenoid valve, and this can preferably be achieved by pre-excitation and/or overexcitation. For special control cases it is also advantageous to bring armatures of the 2/2-solenoid valve into an intermediate position via known PWM methods in order to generate a throttling effect.

The very rapid reduction in pressure can potentially generate pressure variations which retroact on the wheel. To avoid this damaging effect the piston travel, as a further alternative, can be controlled according to, for example, 80% of the required pressure reduction (rapid pressure reduction). The remaining requisite 20% pressure reduction can then take place slowly by way of a subsequently controlled, slow piston movement, or in the alternative with pressure reduction control via solenoid valves by clocking of the solenoid valve and staggered reduction. Damaging wheel vibrations are thus avoided. The slow reduction in pressure can thus be continued until the wheel accelerates again in the case of ABS control.

Very small deviations in the wheel speed are thereby possible. The above-described method can analogously also be applied to the pressure build-up. The speeds of pressure increase can be optimised according to control-engineering criteria. The aim of braking the wheel in the immediate proximity of the maximum frictional force can be achieved thereby and an optimum braking effect can be attained with optimum driving stability.

Special cases of control have been mentioned above in which a throttling effect is advantageous. This is the case for example if a pressure reduction is required in two wheels simultaneously. The throttling effect is advantageous in this case until the setting piston has provided such a large chamber volume that the then subsequently rapid pressure reduction to vacuum can take place from a different pressure level. The procedure may be similar, i.e. if the solenoid valves have an incorporated restrictor in their cross-section and a pressure build-up should take place at both wheel circuits simultaneously. The individual, alternating pressure build-up is preferable however owing to the regulated build-up with evaluation of the performance data and controlled adjusting speed of the piston. The same alternating method can be used as an alternative to that mentioned above with the throttling effect for pressure reduction. As a further possibility the piston can be reversed by a control signal with a lower response level as the control signal for the pressure reduction. According to the prior art this is the signal at which the regulator recognises a blocking tendency and switches the SV to pressure maintenance (see Bremsenhandbuch, pages 52 to 53). This signal is emitted 5 to 10 ms before the pressure reduction signal. The proposed high-speed drive is capable of providing a chamber volume for 10 bar pressure reduction within about 5 ms.

By using the piston position for pressure reduction the regulator can decide whether there is sufficient chamber volume for simultaneous pressure reduction of both wheel brakes.

These embodiments show that the design with the fast and variably regulated electromotive piston drive and the solenoid valve with evaluation of the pressure and performance data presents a high potential for the regulator, and this allows additional braking distance reductions and driving stability.

Figure 2:
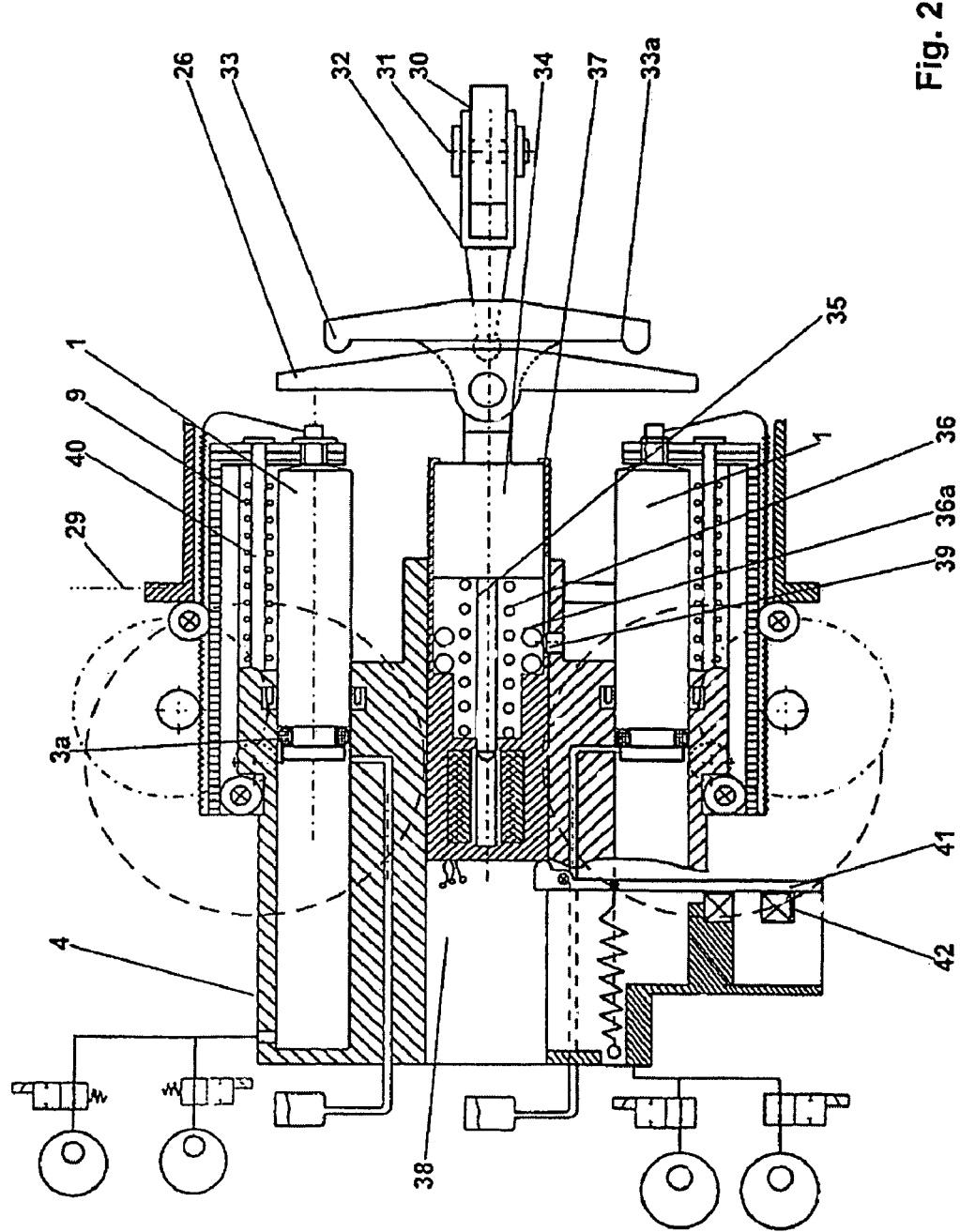
FIG. 2 shows a second embodiment of the brake system with two piston-cylinder systems for two brake circuits for two wheel brakes respectively.

FIG. 2 shows the overall integrated unit for PAB and control functions. The unit comprises two piston units with associated electric motors and gears according to FIG. 1 for two brake circuits and four wheel brakes. The piston units are accommodated in the housing 4. This housing is secured to the end wall 29.

The brake pedal 30 transmits the pedal force and movement via the bearing pins 31 to a fork 32 which acts on the actuating device 33 via a ball-and-socket joint. The actuating device has a cylindrical projection 34 with a rod 35.

Cylinder 34 and rod 35 are mounted in a bush 37. This receives the travel simulator springs 36 and 36a, one spring having a weak effect and the other spring having a force increase with a markedly progressive effect. The travel simulator can also be constructed from even more springs or rubber elements. This predefines the pedal force characteristic. The pedal travel is detected by a sensor 38 which in the illustrated example is constructed according to the eddy current principle in which the rod 35 submerges with a target.

The pedal movement is transmitted to the elements 32 and 33, the piston 34 moves with the rod 35 in the bush 37. A lever 26 is rotatably mounted on the actuating device and strikes the piston in the event of failure of the energy supply. The pedal travel sensor supplies the travel signal to the electronic controller which brings about a movement of the piston via the electric motor in accordance with the PAB characteristic curve, as is described in FIG. 7. The parameters of this characteristic curve are described in more detail in FIG. 7. A clearance $s_o$ is provided between the lever 26 and the two pistons 1, as is shown in FIG. 1. By way of the stud 39, shown offset, the actuating device has an anti-rotation element, and a restoring spring 40, which assists the pedal restoring spring (not shown). According to the prior art a large number of travel simulator solutions is known, some of which are also hydraulically actuated via pistons and are blocked by solenoid valves if the energy supply fails. This solution is complex and subject to hysteresis. Solutions are also known in which the travel simulator path is adopted as a loss path when the piston is actuated to generate brake pressure in the event of failure of the energy supply.

The aim of the invention is a simple solution in which the travel simulator is switched off if the energy supply fails. For this purpose, when the energy supply is faultless a counter-force is exerted on the bush 37 via the armature lever 41 with a high gear ratio and the holding magnets 42, the counterforce being dispensed with if the electrical energy supply fails. To reduce the magnet two-stage levers may also be used. This is described in detail in FIG. 3. In this case the lever, after passing through the clearance $s_o$, comes into contact with the two pistons via the brake pedal and can transmit the pedal force to the pistons. The pistons are dimensioned in such a way that in the case of full pedal travel they generate a pressure which still results in a good braking effect, for example 80%. The piston stroke is considerably greater than the pedal travel however and with a faultless energy supply and electrical drive can generate much higher brake pressures. The driver cannot apply the corresponding pedal force however. In the case of this design this is called a gear jump and it is possible by decoupling the actuating unit with travel simulator from the piston. With a conventional construction in which the PAB and master cylinder with piston are connected in series, the required pedal force increases up to a factor of 5 for the same wheel brake pressure if the energy supply fails. In the new design the factor can be reduced to 3 for example. This case is relevant for example when towing a vehicle when the battery has failed.

The lever 26 is rotatably mounted, so it can take account of tolerances in the movement of the pistons, for example owing to varying ventilation. This compensation can also be limited, so the lever comes to rest on a stop 33a of the actuating device.

Even more faults have to be considered, however.
Failure of an Electric Motor.

In this case the boost and regulation in the adjacent, faultless piston drive is fully active. Brake pressure is generated in the failed circuit via the lever 26, since the lever rests on the stop 33a. In this case the booster characteristic curve of the second circuit can also be increased, and this reduces the required pedal force. This can however also take place without a stop.
Failure of a Brake Circuit.

In this case the piston moves toward the stop in the housing 4. The faultless second circuit is fully active. A failing pedal, which, as is known, the driver finds very irritating, does not result as in current conventional systems. The irritation can also lead to complete loss of braking effect if the driver does not depress the pedal.

Figure 3:
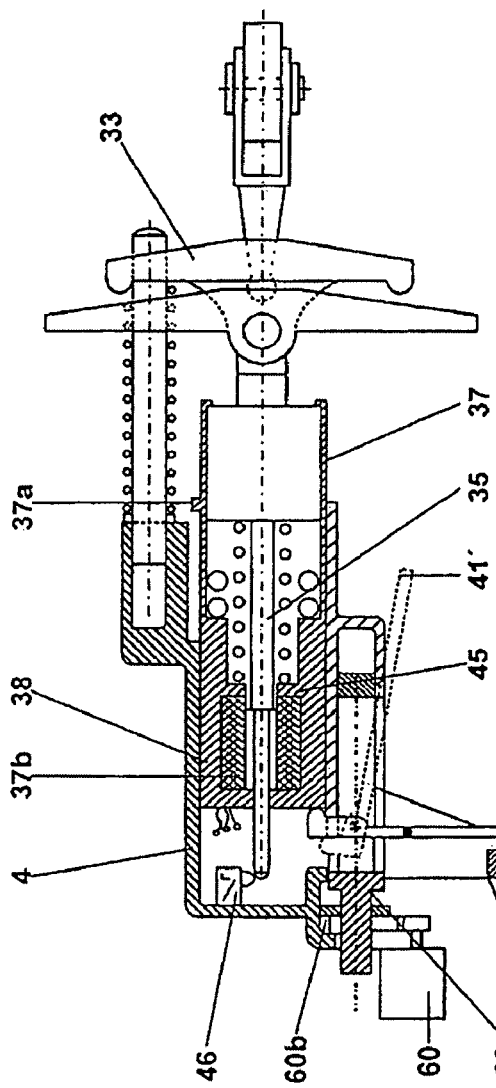
FIG. 3 shows a travel simulator for the brake system according to the invention.

FIG. 3 describes the function of the travel simulator locking device. In a borderline case the driver can apply high pedal forces, and this has to apply the locking device via the armature lever 41. To avoid the magnet 42 with excitation coil 43 having to fully apply these forces, the upper, crowned end 41a of the lever acts asymmetrically on the bush 37. If the pedal is accordingly moved until the rod 35 meets the floor 37b then this lever effect brings about a slight rotation of the bush 37, and this generates friction in the guide, it being possible for the lug 37a to also be supported on the housing 4. The magnetic force can thus be kept relatively low. The magnet is also configured as a magnetic clamp 42, so a low holding capacity is required owing to the small air gap. If the energy supply fails the armature lever 41 is moved by the bush 37 into the position 41' indicated by dot-dash lines. If the actuating device 33 returns to the starting position again, the restoring spring 44 brings the armature lever back to the starting position.

The sensor 38 has been moved to the end of the hole in the bush in the housing 4, and this has advantages for contact with the electric controller, as is shown in FIG. 6. The same applies to the brake light switch 46. The target 45 for the eddy current sensor is illustrated in this embodiment.

Locking of the travel simulator via the bush 37 can be modified in order to avoid the pedal reaction, described in FIG. 7, in the case of ABS. For this purpose the lever 41 with its mounting and magnet 42 with receiver 42a can be moved by an electric motor 60 which drives a spindle 60a via a gearing 60b. The lever is mounted on the extension of the spindle and secures the magnet housing.

FIG. 4 shows a basic illustration of a solution with only one electric motor 7a. This description builds on FIG. 1 and FIG. 2. The drive pinion of the motor moves the toothed rack 5c, which, similar to as in FIG. 1, can also be offset in parallel. The toothed rack is connected to a piston 1a which builds up pressure in the brake circuit 13a and via the pressure simultaneously displaces the piston 1a, which builds up pressure in brake circuit 13. The piston arrangement corresponds to a conventional master cylinder, for the piston and seal designs of which there exist many variations. As in the above figures, the 2/2-way solenoid valves 14, 14a, 15, 15a are arranged in the brake circuits. The ABS pressure modulation takes place in the above-described manner. The PAB function takes place via a travel simulation 36 and proximity sensor 38 arranged in parallel. A clearance or idles stroke $s_o$ is also provided in this case between piston 1a and brake pedal. The brake fluid passes from the reservoirs 18, 18a into the respective piston chambers. This arrangement is inexpensive. The dynamic performance of the PAB function in pressure build-up is lower than in the variant with two motors since the electric motor has to apply twice the torque. The redundancy function of the second motor is also dispensed with, as is described in FIG. 7, including a failed pedal in the event of brake circuit failure.

In FIG. 4, a pressure transducer 73b is arranged in the primary brake circuit 13a. It measures the corresponding brake pressure. Since the pressure of this circuit acts via the piston 1b on the second brake circuit 13 as well, this pressure transducer 73b can detect both brake circuits in the case of modulation since during pressure modulation for the ABS function each wheel brake can be individually regulated via the 2/2-solenoid valves 14, 14a, 15, 15a. In a variation shown in FIG. 4b, pressure transducers 73b may be arranged in the primary and secondary brake circuits 13 and 13a. The pressure and the pressure reduction of each wheel brake can thus be measured.

In FIG. 4a each brake circuit 13, 13a has a separate drive 7a, 7b for the corresponding pressure modulating pistons 1a and 1b. As shown, the pressure modulating pistons may also have corresponding cylinder housings (or sub-housings) 4a', 4b' and/or springs 9a, 9b. In contrast to FIG. 2 the drive 7b is not connected to the brake pedal 30. The two drives are preferably arranged parallel so a short overall length may be achieved. Apart from the short overall length the advantage of this arrangement lies in the simpler construction and modularity. In this connection it is assumed that for small cars to sophisticated mid-size cars the system corresponding to FIG. 4 is used and only in the case of heavy vehicles is a single drive motor no longer sufficient and is therefore divided into two drives. A pressure transducer can be inserted in each brake circuit upstream of the solenoid valves as a function of the requirements.

FIG. 5 shows the view from the end wall onto the integrated modular unit, of which the flange 4b is screwed by means of screws 47 to the end wall. The actuating unit 33, lever 26 and a stud 39, shown not offset, as an anti-rotation element can be seen. The outline of 10" vacuum PAB is shown for size comparison. An important advantage in the overall height with the cover 48 of the reservoir can be seen here. According to the spacing A the end wall could be lowered, and this is what designers desire. The drive of the toothed rack 5 is illustrated in broken lines on the left-hand side of the flange with reference to FIG. 5a. This detail is shown enlarged as FIG. 5a in the right-hand half of the figure. The pinion of the toothed wheel 6 meshes in the H-shaped configuration of the toothed rack 5 on both sides. The described transverse forces are supported by the roller 10 or 11 according to FIG. 1 with mounting 10a. For cost reasons the toothed rack can be made from plastics material. Since the surface pressure thereof is not sufficient strips of hard sheet metal 49 are inserted here which, in the case of a slightly crowned construction of the support, adapt to the rollers. The gearwheel 7 is pressed into the pinion 6 and is engaged with the motor pinion. The pinion is preferably mounted in the motor casing 8a.

FIG. 6 shows the side view of the integrated modular unit with housing 4, fork 32 for brake pedal 30, actuating unit 33, flange 45, fastening screws 47 and cover 48. This view shows the short overall length in which the electronic controller 50 is provided at the front. According to the prior art the controller is connected to the coils or a part of the magnetic circuit of the solenoid valves 14 and 16 to also reduce contacting lines and electrical connecting lines. This feature can be expanded by directly connecting all electrical components, such as electric motor 8, magnet coil 43, proximity sensor 38, brake light switch 46 and brake fluid level indicator 53, to the controller without electrical connecting lines. In this case the controller has to be fitted from above, direction 50a. However it is also possible in direction 50b, and this results in a modified arrangement of the magnet coil.

The solenoid valves are preferably fastened to a mounting plate 51 since for cost reasons this can be impressed in aluminium with a high elongation at break. The screw plugs 52 for the brake lines are screwed into this mounting plate. The contacting is illustrated in the middle section of the controller and in the region 54 includes a redundant power supply, the bus line in the region 55 and at 56 the sensors for ABS and ESP.

FIG. 7 shows the basic characteristic curves of the brake system. Pedal force $F_P$, brake force pressure p and pedal travel at the actuating unit are shown. A ratio of 4 to 5 is conventionally chosen from here to the pedal foot. The pedal travel has its maximum at $S_P$ and the pistons, as already mentioned, at a higher value $s_x$. Reference numeral 57 shows what is referred to as the pressure-displacement characteristic curve which in this case corresponds for example to a brake circuit. The non-linear course results from various elasticities, such as those of calliper, seals, lines, residual air inclusions and compressibility of the fluid. This curve shows the mean of a distribution range, which is also temperature-dependent, in particular in the case of the calliper. Performance data therefore have to be applied to the current-proportional pressure control.

The characteristic curves 59 show the failure of the electric drive in which the pistona are actuated after clearance $S_0$. To attain for example 100 bar, the described, considerably higher pedal forces $F_{PA}$ of approx. 600 N are required here, and this corresponds to a pedal force that is more than 40% lower than in the case of current solutions.

It can be discerned from the pedal position and the brake pressure that the pressure modulation of 10 bar at blocking pressures >50 bar does not retroact on the pedal since the pedal strikes the locking device at S. With lower blocking pressures there is a reaction on the pedal when the pressure is reduced and built up if the pedal is fully depressed and is therefore comparable with current ESP and ABS systems. However it is possible to reduce the reaction or avoid it by using an electric motor 60, described in FIG. 4, which adjusts the travel simulator locking device via a drive. The pedal is moved back by the piston drive 6 to reduce the pressure. At this instant the motor adjusts the drive with a small force. A pedal movement to warn the driver is thereby also possible, for example in the event of a traffic jam or the like. A reaction is possible even without this additional motor if the pedal movement is greater than the play $S_o$ and the pistons are briefly retracted as a warning.

The thicker lines are the booster lines 58 and 58a which show the allocation of pedal force $F_P$ to brake pressure. At approx. 50% of the maximum pedal travel the travel simulator is fully controlled at $S_S$.

This has the advantage that full brake application is possible with short pedal travel. The pedal travel is detected by the sensor 38 in this connection. The allocation of the pressure to the pedal force is freely variable and can for example, in the broken lines, also take into account the vehicle deceleration by incorporating this in the boost as a correction value, so a higher pressure is adjusted in the case of fading of the brake with the same pedal force. This correction is also necessary in systems with recuperation of the braking energy via the generator since the braking effect of the generator has to be taken into account. The case is similar in panic braking with high pedal speed. In this case a much higher pressure can be fed in superproportionally to the pedal force and with a delay follows the illustrated static characteristic curve again (solid line).

At $F_{P1}$ a foot force of 200 N is usually fixed for the braking pressure of 100 bar. This pressure corresponds to the blocking limit in the case of a dry road. In this range the travel simulator characteristic curve is almost linear, so good control is ensured. As a rule a maximum pressure of 160 bar is sufficient, according to which the fatigue strength of the elements is dimensioned. For unusual stresses a reserve R can however be provided, which, for example, can become effective if the blocking limit has not yet been attained at 160 bar.

The electric drive can be regarded as being more fail-safe than the vacuum PAB in the event of failure of the energy supply since for the proposed invention at least two electromotive drives are used, i.e. one is redundant and, as is known, the overall failure rate $\lambda_g = \lambda_1 \cdot \lambda_2$ applies. Failure of the energy supply during travel can be virtually ruled out since generator and battery practically do not fail at the same time. The redundant power supply described in FIG. 7 prevents a break in the electrical power supply. With booster elements, supply lines and optionally pumps, the vacuum PAB is not redundant.

FIG. 8 shows a further solution to the piston drive. Instead of the toothed rack a rocker arm 60 can be used which is connected by a tension strut 61 via the journals 62 to the piston. The restoring spring 9 acts on the rocker arm, the starting position of which is given by the stop 655. The rocker arm is driven by the motor 11 via a multi-stage gearing 63.

FIG. 8a shows a two-armed rocker arm 60 and 60a with two tension struts 61 and 61a. Only low transverse forces act on the piston therefore. The gearing 63 is encapsulated in an expanded motor casing 64 here and is driven by the drive pinion 11a of the motor 11. The advantage of this solution lies in the encapsulation of the gearing, and this makes oil or lubricant filling possible, allows helical gearing and can therefore be loaded to a higher degree and creates less noise.

FIG. 9 shows a further alternative with a spindle drive which is arranged inside the rotor of the electric motor. This arrangement is known from DE 195 11 287 B4 which is based on electromechanically actuated disk brakes. In the presented solution the nut 67 is located as a separate element in the hole of the rotor 66 and is supported on the flange 66a of the rotor. The compressive forces of the piston 1 act thereon. The spindle drive also acts as a reduction gear, the spindle 65 transmitting the force to the piston. All previously illustrated drives have a reduction gear that is permanently coupled to the piston and in the event of failure of the energy supply has to be moved by the brake pedal and in the case of fast pedal actuation has to be accelerated by the motor. These forces of mass inertia prevent fast pedal actuation and irritate the driver.

To avoid this the nut is axially moveable in the hole of the rotor, so with pedal action the ball screw is opened. For normal operation with an electric motor the nut is fixed at 70 mm by a lever which is active with fast resetting of the piston, in particular if there is a vacuum in the piston chamber. This lever is mounted in the rotor via the shaft 71 and when the motor is not turning is moved via the spring 72 into a position in which the nut is free. Since the drive motor accelerates extremely quickly the centrifugal force acts on the lever in this connection and the nut is surrounded by the lever for movement of the piston.

This movement can also be brought about by an electromagnet, shown by broken lines, in which the lever is a rotating armature. The corresponding magnet yoke can be radially peripheral (not shown in full) or be axially integrated as a well in the housing of the motor.

The moment of torsion generated by the nut on the spindle is absorbed by two bearing pins 69 and 69*a*. These pins are also carriers for the restoring spring 9. The rotor is preferably mounted in a ball bearing 74, which receives the axial forces of the piston, and in a sliding bearing 75, which can also be a rolling bearing. It is also possible to arrange the rolling bearing 74 on the side of the spindle nut and the sliding bearing on the side of the pressure modulating piston.

This solution requires a relatively long overall length, and this becomes clear in comparison with FIG. 9 since the immersion length of the spindle into the nut is equal to the piston travel. To keep this extension small the motor casing 74 is flanged directly to the piston housing 4. This also has the advantage of the choice of different materials for motor and piston housing.

The nut 67 can also be directly connected to the rotor 66, for example by injection. A plastics material nut with a small coefficient of friction can be used for the required forces.

If a motor or the energy supply fails the pedal (not shown) acts on the fork according to FIG. 2, and via the lever 26 following the empty run $s_o$ on the spindle 65 or piston 1. Since blocking of the drive should be ruled out in this solution, the stop 33 can have a smaller spacing from the lever. This has the advantage that the pedal force acts fully on the pedal if for example an electric motor fails. As soon as the lever is supported on the opposing end in the case of a rotation, only half the pedal force continues to act on the piston. In the constructive embodiment spindle and piston are decoupled, and this has not been stated separately.

Resetting of the piston into the starting position is important. If the motor fails in an intermediate position, the piston restoring spring can also be assisted by a helical spring 66*a* which is arranged at the end of the rotor 66 and motor casing 74 and is coupled thereto. This should equalise the detent torque and moment of friction. This is particularly advantageous for small piston restoring forces which act on the pedal in conjunction with the coupling lever described in FIG. 9 if the energy supply fails.

As already mentioned the EC motor requires an angle sensor to regulate the piston position and to switch on the coil phases. EC motors for the spindle drive preferably use segment sensors which, distributed over the periphery, scan the individual angular elements. This solution is relatively complex. It is therefore proposed that the rotor 66 drives a toothed wheel 80 which is mounted in the motor casing 74*a*. On its end face 80*a* the toothed wheel has a target, preferably an appropriately polarised permanent magnet which acts on the sensor element 81 and generates a signal proportional to the angle of rotation. This sensor element is preferably a Hall sensor. This construction is simple and may also easily be configured so as to be redundant.

FIG. 10 shows a further simplified embodiment with an electromotive piston drive in which the piston 1 again carries out power-assisted braking and pressure modulation for ABS. The piston chambers 1' are connected according to FIGS. 1 to 9 via lines 13 and 13*a* to the wheel brakes (not shown) and to the solenoid valves (not shown either). The construction corresponds to FIG. 8 with spindle drive 65 and rotor 66, permanently connected nut 67, separation of motor and piston, housing 74 and 4, piston restoring springs 9 and bearing pin 69 and helical spring 66*a* for motor resetting. Similar to as in FIG. 2 the pedal force is transmitted from a fork 26 to an actuating device 34 with rod 35. This is mounted in the motor casing 74 and in an extension carries a target 45 for example for an eddy current sensor 38 which measures the pedal travel. The actuating device is reset by a spring 79. A lever 26 is again mounted on the actuating device 35 and at its end connected to the piston preferably carries leaf springs 76 which in the case of a strong leaf spring are connected to a displacement transducer 77 or in the case of a relatively weak spring to a power transmitter 77*a*. In both cases the force transmitted by the lever or pedal should be measured. On pedal actuation the leaf spring 76 has the task of avoiding a severe reaction before the motor starts. Operation takes place such that in a specific function of this pedal force the motors exert a boosting force on the piston, it being possible to again determine this force from the current and piston travel or a pressure transducer. In this connection the pedal travel via the proximity sensor 38 can be co-processed in this booster function or characteristic curve. This sensor can also assume the booster function, in conjunction with the restoring spring 76, at the start of braking in the case of low pressures. In this case the spring 79 takes on the function of the travel simulator spring.

The motor casing has a flange for fastening the unit via the screw bolts 78 in the end wall. This simplified design does not have the complexity of the travel simulator and locking device. Drawbacks are the limited pedal travel characteristic of the booster characteristic curve, failure of the pedal in the case of brake circuit failure and higher pedal forces in the case of booster failure since pedal travel and piston travel are identical. This embodiment is predominantly suitable for small vehicles.

In the embodiment according to FIG. 10 safety valves 80 are illustrated by way of substitution for all solutions. The safety valves become effective if for example a piston drive jams when the pedal returns to the starting position. On pedal movement at least two safety valves 80 are actuated by a conical extension of the actuating device 35, the valves closing the connection from brake circuit 13 to solenoid valves 14 and 15 and from brake circuit 13*a*, 14*a*, 15*a* to return. The solenoid valve arrangement corresponds to that in FIG. 4 in this case. Each wheel circuit preferably requires a mechanical safety valve. This ensures that when the pedal is in the starting position no brake pressure is built up in the brake circuit. These valves can also be actuated by electromagnets.

Safety-relevant systems usually have a separate cut-off facility for faults in the output stages, for example full current flow due to failure. For this case a cut-off facility, for example by way of a conventional relay, is installed. The diagnostic part of the electric circuit recognises this fault and switches off the relay which normally supplies the output stages with current. Even in the designs proposed here a cut-off facility has to be provided and is implemented by a relay or a central MOSFET.

In view of the pulsed control of the electric motors a safety fuse may also be used since the pulse-off ratio is very high.

FIGS. 11 and 11*a* show in detail fixing, indicated in FIG. 9, of the spindle nut 67. The lever 70 is preferably configured in such a way that the centrifugal force components boost the magnetic force. The advantage of magnetic actuation lies in the fact that the spindle nut is locked as early as at the start of the rotary movement. If there is no rotation, the magnet is not switched on. With centrifugal force actuation only, clearance must be provided between lever and spindle nut since the lever 70 or the rotor 66 has to generate a corresponding angular velocity to generate the centrifugal force. With magnetic actuation the clearance s is small.

The illustration shows the advantages of a pot-like construction of the magnets which can be integrated in the housing at an end face of the motor. The figure also shows the bearing 71 of the lever in the rotor 66. The lever is pressed by a restoring spring 82 onto a stop (not shown) without an external force acting on it. If the motor drive fails the pedal force Fp acts on the spindle 65 and the spindle nut moves in the rotor hole. In this case the spindle nut moves in a sliding block 83 which transmits the torque from the rotor to the spindle nut when the drive is working.

FIG. 11*a* shows a variation without magnet 70 but with mounting 71 and restoring spring 82 to generate the corresponding centrifugal force components. In this case the clearance s has to be greater for said reasons.

The construction (not shown) of the motor can be found in DE 102005040389.

What is claimed is:

1. A brake system comprising:
an actuating device;
a control and regulating device;
an electromotive drive device;
a piston-cylinder system;
a non-hydraulic gearing device physically attached to a piston of the piston-cylinder system;
a pressure line configured to couple a working chamber of a cylinder of the piston-cylinder system to a wheel brake; and
a valve arranged in the pressure line and configured to be controlled by the control and regulating device,
wherein the control and regulating device is configured for controlling the electromotive drive device using the movement and/or position of the actuating device, the drive device configured for adjusting the piston of the piston-cylinder system via the non-hydraulic gearing device, so a pressure is adjusted in the working chamber of the cylinder,
wherein the piston is configured to generate a required change in pressure for power-assisted braking (PAB) and an anti-locking braking system (ABS),
wherein, in the case of failure of the drive device, the actuating device is configured to adjust the piston or the drive device, and
wherein, after achieving a required braking pressure in a brake cylinder, the control and regulating device is configured to close the valve and to open the valve to adjust to a new brake pressure.

2. The brake system according to claim 1, wherein a sensor device determines the position of the actuating device.

3. The brake system according to claim 1, wherein a device for presetting or adjusting a force/travel characteristic of the actuating device is actively connected to the actuating device.

4. The brake system according to claim 1, wherein a spring loads the piston or the drive device with force, the spring force acting in a direction such that the working chamber is enlarged.

5. The brake system according to claim 1, wherein the drive device comprising at least one electric motor.

6. The brake system according to claim 5, wherein when the valve is closed the electric motor is supplied with an exciting current which is sufficient to keep the piston in position against a spring force provided by a spring configured to load the piston or the drive device with force.

7. The brake system according claim 1, the brake system comprising two or more brake circuits, wherein each brake circuit comprises a piston-cylinder system.

8. The brake system according to claim 1, wherein the working chamber is connected to a plurality of brake cylinders via two or more pressure lines, a respective valve being arranged in each pressure line.

9. The brake system according to claim 1, wherein the valve is a 2/2 way valve.

10. The brake system according to claim 1, wherein the piston-cylinder system comprises first and second pistons which are axially displaceably arranged in a cylinder, the first piston being mechanically coupled to the electromotive drive device and the second piston being hydraulically coupled to the first piston, the two pistons between them forming a working chamber which is connected to at least one brake cylinder by at least one pressure line, and the second piston, with the cylinder, forming a second working chamber which is connected to at least one further brake cylinder by at least one further pressure line.

11. The brake system according to claim 10, wherein valves controlled by the control and regulating device are arranged in the pressure lines.

12. The brake system according to claim 10, wherein the brake system comprises a pressure transducer or pressure sensor for detecting the pressure in one of two brake circuits of the brake system or their pressure lines.

13. The brake system according to claim 12, wherein the controller uses the pressure transducer to adjust the brake pressures for the two brake circuits.

14. The brake system according to claim 1, wherein a channel of the working chamber of the piston-cylinder unit is connected to a reservoir, the piston closing the channel when retracted into the cylinder and the channel being opened in the starting position.

15. The brake system according to claim 14, further comprising a valve arranged in the channel, wherein the valve is configured to break the connection between the working chamber and the reservoir.

16. The brake system according to claim 15, wherein when the piston is quickly reset, the seal of the piston does not permit liquid from the reservoir to be released owing to the vacuum in the working chamber.

17. The brake system according to claim 1, wherein the controller adjusts corresponding power-assisted braking as a function of the movement and/or application of force of the brake pedal and/or the driving state and/or braking effect of an electric machine.

18. The brake system according to claim 1, wherein a pressure sensor is provided for determining the braking pressure in the working chamber of the cylinder.

19. The brake system according to claim 1, wherein the control and regulating device has a data storage device in which performance data with various parameters for controlling the drive is stored.

20. The brake system according to claim 1, wherein the controller determines the piston position by means of at least one sensor.

21. The brake system according to claim 1, wherein for generating a quick pressure reduction in the wheel brake before opening of the respective valve, the controller generates a vacuum by means of the associated piston by enlarging the working chamber.

22. The brake system according to claim 1, wherein for establishing an increased blocking pressure before opening of the respective valve, the control and regulating device supplies the electric motor of the drive device with approximately 120% of the preceding blocking pressure in the control cycle.

23. The brake system according to claim 1, wherein energy stores are provided for storing electrical energy in order to generate pulsed currents.

24. The brake system according to claim 1, wherein the control and regulating device pre-excites the valve for fast closing, so the valve immediately closes as a result of a slight excitation intensification.

25. The brake system according to claim 1, wherein the brake system adjusts a boost proportional to the pedal force, the brake system determining the pedal force at the piston.

26. The brake system according to claim 1, wherein the brake system includes at least one pressure transducer or pressure sensor upstream of one or more solenoid valves of one or more respective brake circuits of the brake system, wherein the at least one pressure transducer or pressure sensor is configured to determine brake line pressure.

* * * * *